(12) United States Patent
Yaung

(10) Patent No.: US 7,296,056 B2
(45) Date of Patent: Nov. 13, 2007

(54) METHOD, SYSTEM, AND PROGRAM FOR SELECTING ONE USER TO ASSIGN A WORK ITEM IN A WORKFLOW

(75) Inventor: Alan Tsu-I Yaung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 09/918,181

(22) Filed: Jul. 30, 2001

(65) Prior Publication Data
US 2003/0023728 A1  Jan. 30, 2003

(51) Int. Cl.
G06F 15/16 (2006.01)
G06F 9/46 (2006.01)
(52) U.S. Cl. .................. 709/205; 709/204; 718/104; 718/105
(58) Field of Classification Search ................ 709/219, 709/200–206, 221–229, 201–207, 238–244; 717/100, 1, 102; 705/1–10, 40; 700/101; 718/101, 104–105; 707/500, 501
See application file for complete search history.

(56) References Cited

U.S. PATENT DOCUMENTS

| | | | |
|---|---|---|---|
| 5,301,320 A | 4/1994 | McAtee et al. | |
| 5,535,322 A | 7/1996 | Hecht | |
| 5,572,673 A | 11/1996 | Shurts | |
| 5,596,744 A | 1/1997 | Dao et al. | |
| 5,596,750 A * | 1/1997 | Li et al. ................ | 718/101 |
| 5,630,069 A | 5/1997 | Flores et al. | |

(Continued)

FOREIGN PATENT DOCUMENTS

EP  982675  8/1999

(Continued)

OTHER PUBLICATIONS

Choudhury, G.S., C. Requardt, I. Fujinaga, T. Dilauro, E.W. Brown, J.W. Warner, and B. Harrington, "Digital Workflow Management: The Lester S. Levy Digitized Collection of Sheet Music", [online], © 2000 *First Monday*, [Retrieved on Mar. 17, 2005], retrieved from the Internet at <URL: http://firstmonday.org/issues/issue5_6/choudhury/index.html>.

(Continued)

*Primary Examiner*—Saleh Najjar
*Assistant Examiner*—Asad M Nawaz
(74) *Attorney, Agent, or Firm*—Konrad Raynes & Victor LLP; David W. Victor

(57) ABSTRACT

Provided is a method, system, and program for assigning a work item for one of a plurality of nodes in a workflow to at least one of a plurality of users capable of performing workflow related operations at the nodes. A node in a current workflow is processed, wherein a current work item is associated with the processed node. A determination is made of users capable of being assigned the current work item. For each determined user, a determination is made of a number of work items other than the current work item assigned to the user. At least one determined user is selected based on the determined number of work items assigned to the determined users. The current work item is assigned to the at least one determined user.

42 Claims, 10 Drawing Sheets

U.S. PATENT DOCUMENTS

| | | | |
|---|---|---|---|
| 5,634,053 | A | 5/1997 | Noble et al. |
| 5,634,127 | A | 5/1997 | Cloud et al. |
| 5,721,912 | A | 2/1998 | Stepczyk et al. |
| 5,721,913 | A | 2/1998 | Ackroff et al. |
| 5,734,837 | A | 3/1998 | Flores et al. |
| 5,745,683 | A | 4/1998 | Lee et al. |
| 5,745,687 | A * | 4/1998 | Randell .................. 709/201 |
| 5,752,027 | A | 5/1998 | Familiar |
| 5,774,661 | A | 6/1998 | Chatterjee et al. |
| 5,790,789 | A * | 8/1998 | Suarez .................. 709/202 |
| 5,794,250 | A | 8/1998 | Cariño, Jr. et al. |
| 5,826,086 | A | 10/1998 | Arima et al. |
| 5,826,239 | A * | 10/1998 | Du et al. .................. 705/8 |
| 5,860,066 | A | 1/1999 | Rouse |
| 5,864,843 | A | 1/1999 | Cariño, Jr. et al. |
| 5,873,083 | A | 2/1999 | Jones et al. |
| 5,892,905 | A | 4/1999 | Brandt et al. |
| 5,913,214 | A | 6/1999 | Madnick et al. |
| 5,926,636 | A | 7/1999 | Lam et al. |
| 5,930,512 | A | 7/1999 | Boden et al. |
| 5,937,388 | A * | 8/1999 | Davis et al. .................. 705/8 |
| 5,951,649 | A | 9/1999 | Dobbins et al. |
| 5,960,420 | A | 9/1999 | Leymann et al. |
| 5,987,422 | A | 11/1999 | Buzsaki |
| 5,991,733 | A * | 11/1999 | Aleia et al. .................. 705/8 |
| 6,006,193 | A | 12/1999 | Gibson et al. |
| 6,012,067 | A | 1/2000 | Sarkar |
| 6,044,378 | A | 3/2000 | Gladney |
| 6,061,667 | A | 5/2000 | Danford-Klein et al. |
| 6,065,009 | A | 5/2000 | Leymann et al. |
| 6,073,109 | A * | 6/2000 | Flores et al. .................. 705/8 |
| 6,073,111 | A | 6/2000 | Leymann et al. |
| 6,088,729 | A | 7/2000 | McCrory et al. |
| 6,115,646 | A | 9/2000 | Fiszman et al. |
| 6,151,583 | A * | 11/2000 | Ohmura et al. .................. 705/8 |
| 6,170,002 | B1 | 1/2001 | Ouchi |
| 6,226,641 | B1 | 5/2001 | Hickson et al. |
| 6,278,977 | B1 | 8/2001 | Agrawal et al. |
| 6,308,163 | B1 * | 10/2001 | Du et al. .................. 705/8 |
| 6,338,074 | B1 * | 1/2002 | Poindexter et al. ......... 715/500 |
| 6,345,296 | B1 | 2/2002 | McCrory et al. |
| 6,349,238 | B1 * | 2/2002 | Gabbita et al. ............. 700/101 |
| 6,430,538 | B1 * | 8/2002 | Bacon et al. .................. 705/9 |
| 6,453,320 | B1 | 9/2002 | Kukura et al. |
| 6,487,607 | B1 | 11/2002 | Wollrath et al. |
| 6,539,396 | B1 | 3/2003 | Bowman-Amuah |
| 6,578,006 | B1 * | 6/2003 | Saito et al. .................. 705/9 |
| 6,606,740 | B1 * | 8/2003 | Lynn et al. .................. 717/100 |
| 6,665,674 | B1 | 12/2003 | Buchanan et al. |
| 6,665,814 | B2 | 12/2003 | Hobson et al. |
| 6,681,243 | B1 | 1/2004 | Putzolu et al. |
| 6,687,677 | B1 * | 2/2004 | Barnard et al. .................. 705/7 |
| 6,691,299 | B1 | 2/2004 | Hart et al. |
| 6,721,713 | B1 | 4/2004 | Guheen et al. |
| 6,769,113 | B1 | 7/2004 | Bloom et al. |
| 6,769,124 | B1 | 7/2004 | Schoening et al. |
| 6,816,902 | B1 | 11/2004 | Bandat et al. |
| 6,823,513 | B1 * | 11/2004 | McNally et al. ............. 718/104 |
| 6,832,201 | B1 * | 12/2004 | Leymann et al. ............. 705/7 |
| 6,853,974 | B1 * | 2/2005 | Akifuji et al. .................. 705/9 |
| 6,877,153 | B2 | 4/2005 | Konnersman |
| 6,920,456 | B2 | 7/2005 | Lee et al. |
| 6,937,993 | B1 * | 8/2005 | Gabbita et al. .................. 705/8 |
| 6,941,514 | B2 * | 9/2005 | Bradford .................. 715/700 |
| 2002/0022485 | A1 | 2/2002 | Kolsky et al. |
| 2002/0032783 | A1 | 3/2002 | Tuatini |
| 2002/0038357 | A1 | 3/2002 | Haverstock et al. |
| 2002/0040312 | A1 | 4/2002 | Dhar et al. |
| 2002/0059411 | A1 | 5/2002 | Bamhouse et al. |
| 2002/0103811 | A1 | 8/2002 | Fankhauser et al. |
| 2002/0120685 | A1 | 8/2002 | Srivastava et al. |
| 2002/0143949 | A1 | 10/2002 | Rajarajan et al. |
| 2003/0023472 | A1 | 1/2003 | Lee et al. |
| 2003/0023773 | A1 | 1/2003 | Lee et al. |
| 2003/0033415 | A1 | 2/2003 | Graylin et al. |
| 2003/0131075 | A1 | 7/2003 | Bear et al. |
| 2003/0191681 | A1 * | 10/2003 | Gallion et al. .................. 705/9 |
| 2004/0015821 | A1 | 1/2004 | Lu et al. |
| 2004/0103189 | A1 * | 5/2004 | Cherkasova et al. ......... 709/224 |

FOREIGN PATENT DOCUMENTS

| | | |
|---|---|---|
| JP | 10-081425 | 3/1998 |
| JP | 10-326314 | 12/1998 |
| JP | 11-003298 | 1/1999 |
| JP | 11-175644 | 7/1999 |
| JP | 11-249983 | 9/1999 |
| WO | 9963469 | 12/1999 |
| WO | 0014618 | 3/2000 |

OTHER PUBLICATIONS

Gulcu, C. (Ed.), "Suitable Interface Adaptor (Workflow Module)", *Cross-Organisational Workflow: CrossFlow*, ESPRIT E/28635, Dec. 1999, pp. 1-12.

Hudgins, J. and L.A. Macklin, "New Materials, New Processes: Implementing Digital Imaging Projects into Existing Workflow", *Library Collections, Acquisitions, & Technical Services*, 2000, No. 24, pp. 189-204.

IBM Corporation, "Method for Testing Program Activity Implementations of Workflow Management Systems", *IBM Research Disclosure*, No. 408186, Apr. 1998, pp. 503-505.

IBM Corporation, "Non-Destructive Annotation of Documents in an Image Processig Environment", *IBM Research Disclosure*, No. 430191, Feb. 2000, pp. 404-408.

IBM Corporation, "Runtime Transaction Management in a Transaction Service", *IBM Reseach Disclosure*, No. 416150, Dec. 1998, pp. 1720-1721.

Mohan, C., "Workflow Management in the Internet Age", *Proceedings of the Second East European Symposium on Advances in Databases and Information Systems*, 1998, pp. 26-34.

Nyberg, K., "Workflow Definition Languages", [online], Nov. 21, 2000, retrieved from the Internet at <URL: http://www.cs.hut.fi/~kny.workflowlang/>.

Reinwald, B., "Structured Workflow Management with Lotus Notes Release 4", *Proceedings of the 41st IEEE Computer Society International Conference (CompCon)*, Feb. 1996, pp. 451-457.

Spitzer, T., "Forms, Workflow, and the Web", [online], [Retrieved on Mar. 17, 2005], retrieved from the Internet at <URL:http://www.webtechniques.com/archives/1999/10/busi/>.

Trammell, K., "Work Flow Without Fear", Byte.com, [online], Sep. 6, 2004, retrieved from the Internet at <URL: http://www.byte.com/art/9604/sec8/art1.htm>.

Schuster, H., S. Jablonski, T. Kirsche, and C. Bussler, "A Client/Server Architecture for Distributed Workflow Management Systems", *Proceedings of the Third International Conference on Parallel and Distributed Information Systems*, 1994, pp. 253-256.

Schuster, H., S. Jablonski, P. Heinl, and C. Bubler, "A General Framework for the Execution of Heterogenous Programs in Workflow Management Systems", *Proceedings of the First IFCIS International Conference on Cooperative Information Systems*, 1996, pp. 104-113.

U.S. Appl. No. 09/894,074, filed Jun. 28, 2001, entitled, "Method, System, and Program for Generating a Workflow", invented by WF Miller and AT Yaung.

U.S. Appl. No. 09/894,413, filed on Jun. 28, 2001, entitled, "Method, System, and Program for Using Objects in Data Stores During Execution of a Workflow", invented by JJ Lin; WF Miller; and AT Yaung.

U.S. Appl. No. 09/894,076, filed on Jun. 28, 2001, entitled, "Method, System, and Program for Executing a Workflow", invented by AT Yaung.

Galtzur, Z. et al. "Managing Workflow Using Database Techniques", IBM Technical Disclosure Bulletin, vol. 39, No. 8, Aug. 1996, pp. 199-201.

Yong, Y.M. "Template-Driven Document-Exchange Specification", IBM Technical Disclosure Bulletin, vol. 39, No. 11, Nov. 1996, pp. 173-178.

Duscher, R. et al. "Audit Trail Support For Program Activity Implementations of Workflow Management Systems", 1994, pp. 1-4.

Dr. Leymann, F. et al. "Context Support For Program Activity Implementations of Workflow Management Systems", 1994, pp. 1-4.

Sluiman, H. "A Relational Schema to Support Task and Workflow, Data Collection and Analysis", pp. 1-3, no date.

IBM Corp. "Chapter 4. Introducing Enterprise Information Portal Workflow" from *Managing Enterprise Information Portal*, IBM Enterprise Information Portal for Multiplatforms, Version 7.1, #SC27-0875-00, Product Nos. 5697-G29 and 5697-G31, Aug. 2000, pp. iii-iv and pp. 39-45.

IBM, Corp. "Concepts and Architecture" IBM MQSeries Workflow, Version 3.3, #GH12-6258-03, Product No. 5697-FM3, Mar. 2001, pp. iii-58.

IBM, Corp. "User's Guide for the Work Management Builder" IBM ImagePlus Workfolder Application Facility for AS/400, Version 4 Release 1, #SC34-4587-00, Program No. 5733-A18, Sep. 1997, pp. iii-119.

Su, SYW et al. "An Extensible Knowledge Base Management System for Supporting Rule-based Interoperability among Heterogeneous Systems" 1995, ACM # 0-89791-812-6/95/11, pp. 1-10.

Johansson, SE et al. "Expert Workflow, Building Knowledge-based Workflow Systems with Object Technology", 1997, pp. 45-49.

Leymann, F. et al. "Workflow-based Applications" [online], vol. 36, No. 1—Application Development, pp. 1-22, plus 9 pages of linked Figures (drawings), and 2 pages of "Cited References and Notes". [Retrieved on May 17, 2001]. Retrieved from the Internet at <URL: http://www.research.ibm.com/journal/sj/361/leymann.html>.

Vossen, G. "The WASA2 Object-Oriented Workflow Management System", 1999, ACM # 1-58113-084-8/99/05, pp. 587-589.

* cited by examiner

FIG. 6

| User Defined Priority | Rating |
|---|---|
| 0 | 1 |
| 1-50 | 2 |
| 51-100 | 3 |
| >100 | 4 |

Selection Matrix

METHOD, SYSTEM, AND PROGRAM FOR SELECTING ONE USER TO ASSIGN A WORK ITEM IN A WORKFLOW

RELATED APPLICATIONS

This application is related to the following copending and commonly assigned patent applications, which are incorporated herein by reference in their entirety:

"Method, System, and Program for Generating a Workflow", application Ser. No. 09/894,074 and filed on Jun. 28, 2001;

"Method, System, and Program for Using Objects In Data Stores During Execution of a Workflow", application No. 09/894,413 and filed on Jun. 28, 2001; and "Method, System, and Program for Executing a Workflow", application No. 09/894,076 and filed on Jun. 28, 2001.

BACKGROUND OF THE INVENTION

1. Field of the Invention

The present invention relates to a method, system, and program for selecting one user to assign a work item in a workflow.

2. Description of the Related Art

A workflow program allows businesses and other organizations to define their business operations as a computer model known as a workflow. A workflow defines a series of processes to be performed by users at a client computer. The user activities at the client computers may involve updating an electronic form, reviewing information, etc. After one user in the workflow performs a specified action, the work item or other information is then routed to one or more further nodes where further action may be taken. For instance, an on-line purchase of a product may involve numerous steps, such as receiving the customer order, routing the customer order to the credit department to process the bill and then routing the order to the shipment department to prepare the shipment. Once the shipment is prepared, the product may be shipped and information on the purchase is then transferred to the customer service department to take any further action. Each of these processes may be defined as nodes in a workflow. A workflow program would then route the customer order to the business agents designated to handle the job. For instance, the initial order would be received by the order department and then routed to a person in shipping and billing. Once the bill and package are prepared, a further invoice may be forwarded to shipping. After shipping sends the package, the shipping agent may then enter information into the invoice and forward the electronic invoice to customer service for any follow up action.

A workflow is designed using workflow software, such as the International Business Machines (IBM) MQSeries Workflow software product. A process modeler is a person that analyzes the business operations, determines how the information related to the operations is routed electronically to client computers, and then defines a workflow model of the operations. The workflow model may be coded in the FlowMark Definition Language (FDL). The workflow model is then imported into a Runtime program that verifies and translates the workflow model into a process template. An instance of the process template can then be invoked to automates the sequence of events defined by the model.

In prior art workflow programs, an access list identifies a group of users associated with each node in the workflow. When proceeding to a node in the workflow, access to the work item for that node is provided to all members of the access list for that node. Anyone of the users on the access list notified of the work item may then access and obtain a lock on the work item and perform the action defined for the work item. Such prior art schemes initially distribute the work item to all members of the access list regardless of their current workload and availability to execute the work item.

For these reasons, there is a need in the art to provide improved techniques for distributing work items in a workflow to the different users permitted to execute the work item in the workflow.

SUMMARY OF THE PREFERRED EMBODIMENTS

Provided is a method, system, and program for assigning a work item for one of a plurality of nodes in a workflow to at least one of a plurality of users capable of performing workflow related operations at the nodes. A node in a current workflow is processed, wherein a current work item is associated with the processed node. A determination is made of users capable of being assigned the current work item. For each determined user, a determination is made of a number of work items other than the current work item assigned to the user. At least one determined user is selected based on the determined number of work items assigned to the determined users. The current work item is assigned to the at least one determined user.

Further, the determined number of work items assigned to each user includes active work items assigned to the user in workflows other than the current workflow.

Still further, when selecting at least one determined user based on the determined number of work items assigned to the determined user, a further determination is made of a priority related to each work item assigned to the user. For each user, an index is calculated based on each priority related to each work item assigned to the user. The index is then used to select one user to assign the new work item.

Additionally, a user defined priority is received, wherein the user defined priority is the priority related to the work item.

In still further implementations, a user defined priority scheme is received that associated a plurality of user defined priorities with a plurality of normalized ratings. A determination is made of a user defined priority related to the work item, wherein the determined priority related to the work item used to calculate the index comprises the normalized rating associated with the user defined priority.

The described implementations provide a methodology for selecting a user to assign a work item when processing a new node in the workflow in a manner that takes into account each users current workload with respect to other work items.

BRIEF DESCRIPTION OF THE DRAWINGS

Referring now to the drawings in which like reference numbers represent corresponding parts throughout:

FIG. 6 illustrates a user defined priority scheme in accordance with implementations of the invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
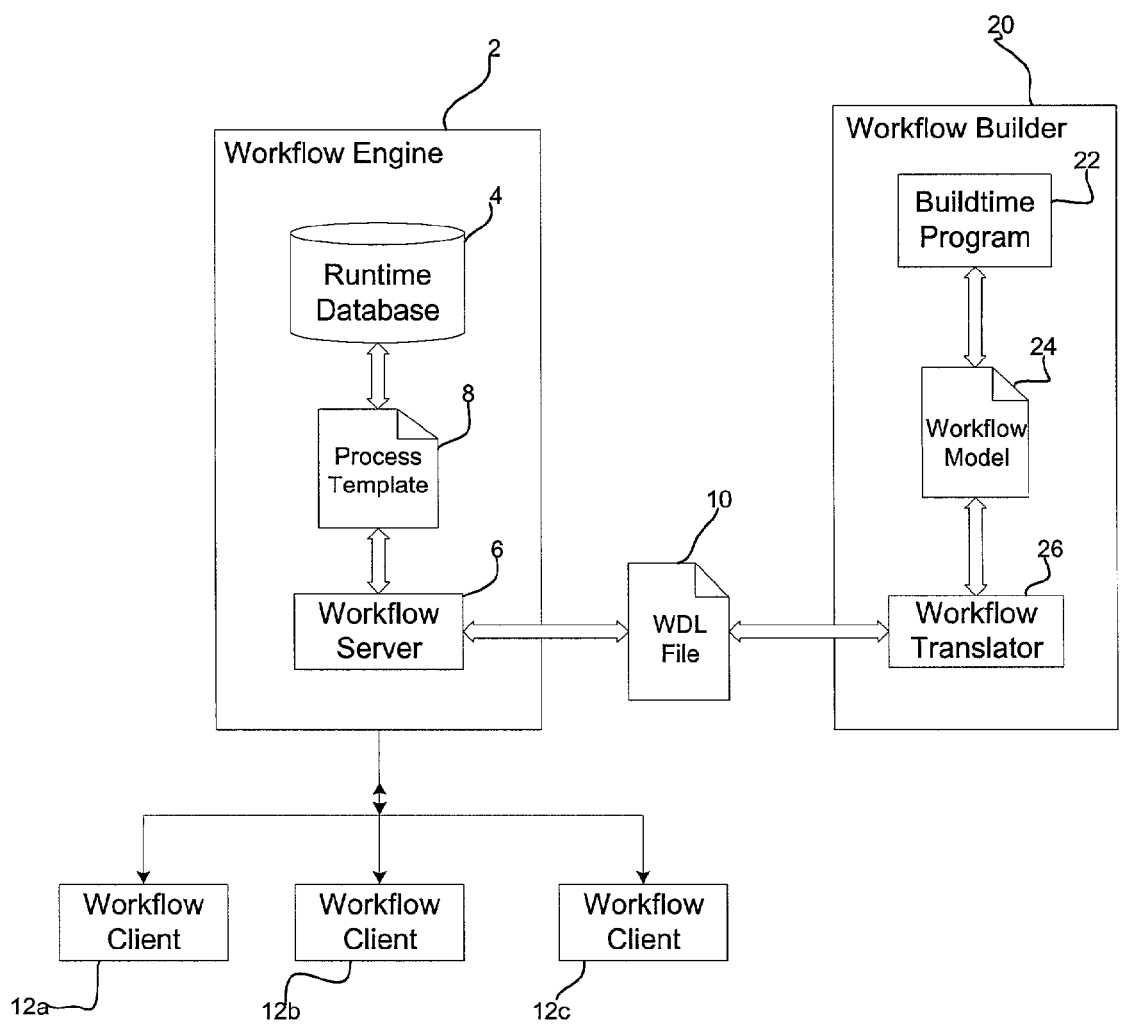
FIG. 1 illustrates a workflow computing environment in which aspects of the invention are implemented.

FIG. 1 illustrates a workflow environment implementation in which the invention is realized. A workflow engine 2 includes a runtime database 4 and a workflow server 6, such as the IBM MQSeries Workflow server. The workflow server 6 is capable of transforming a workflow model coded in a workflow definition language (WDL) file 10, such as FDL, into a process template 8 implemented in the runtime database 4. The runtime database 4 stores database tables that implement the data structures that provide the status and setup information needed for workflow process execution. Whenever the state of a process activity changes, such information is recorded in the runtime database 4. The runtime database 4 may be implemented using any database program known in the art, such as IBM DB2.**

**MQSeries, IBM, and DB2 are registered trademarks of International Business Machines Corp.; Microsoft and Microsoft SQL Server are trademarks of Microsoft Corporation; ORACLE is a trademark of the Oracle Corporation; Java is a trademark of Sun Microsystems, Inc.

The workflow server 6 coordinates and manages the execution of processes for a defined process template 8. The workflow server 6 executes any programs associated with a process defined for the workflow, interprets the process definitions, creates process instances and manages their execution, manages processes and states, logs events, communicates with users as part of the workflow, etc. The workflow server 6 may include a database client program (not shown) to access and update records related to the workflow being processed maintained in the runtime database 4. The workflow server 6 processing may be distributed across multiple computers to achieve workload balancing.

The workflow clients 12a, b . . . n represent the client computers that execute workflow application program interfaces (APIs) to perform workflow related actions and activities and return messages to the workflow server 6. The workflow clients 12a, b . . . n thus comprise instances of the workflow code on the client computers that allow users to interface with the executing workflow and the workflow server 6. The workflow server 6 would execute activity programs as part of executing the workflow and transmit messages and data to the workflow client 12 to request user action to proceed with the workflow. The actions associated with the nodes and executed by the workflow server 6 may comprise Java servlets. The workflow client 12 may comprise a Web browser capable of executing Java scripts transferred from the Java servlet executing on the workflow server 6. Further, details on implementations and interactions of the workflow server 6 and client 12 are described in the IBM publication "IBM MQSeries Workflow: Concepts and Architecture, Version 3.3", IBM document no. GH12-6285-03 (March, 2001), which publication is incorporated herein by reference in its entirety.

A workflow builder 20 comprises a system including a buildtime program 22 that implements a plurality of graphical user interface (GUI) panels in which a user may define the components of a workflow model 24. A workflow translator 26 converts the workflow model 24, with the defined workflow components, into a workflow definition language (WDL) file 10 that implements the workflow model 24. The workflow definition language (WDL) may comprise the FlowMark Definition Language (FDL), Workflow Process Definition Language (WPDL) or any other workflow definition language known in the art that is used to define workflows. The workflow translator 24 would transfer the WDL file 10 to the workflow server 6 to transform into a process template 8 in the runtime database 4 in a manner known in the art. Further details of using the buildtime program 22 to build workflows are described in the copending and commonly assigned patent application "Method, System, and Program for Generating a Workflow", having docket no. STL920000044US1, which application was incorporated herein by reference above.

The workflow engine 2, and each of the program components therein, such as the runtime database 4 and workflow server 6, may be implemented in one or more computing machines. The workflow clients 12 which provide the workflow interface to users may be implemented on one or more client machines. The workflow builder 20, including the buildtime program 22 and workflow translator 26 programs, may be implemented on one or more computing machines. Any portion of the workflow engine 2, workflow builder 20, and/or workflow client 12, and program components therein, may be implemented on the same computing machines or separate machines. The computing machines used to implement the workflow engine 2, workflow clients 12, and workflow builder 20 may comprise any computing device known in the art, such as a server, workstation, mainframe, personal computer, laptop computer, hand held computer, telephony device, etc.

One use of a workflow is to generate a final product, which may comprise the result of the effort of a single business unit or the cumulative efforts of multiple users and units within an organization. To produce the final product, a workflow packet comprised of one or more documents would transfer through various user work stations in the company defined as nodes in the workflow to require the user associated with such node to handle and process and forward to another user to handle. A document is comprised of a multimedia item that has digital content.

For instance, an insurance company may have to process numerous documents related to an insurance claim, such as photographs, appraisals, expert reports, etc. Employees may spend a substantial amount of time sorting through documents and associating the documents with particular claims. In the workflow model, all the documents related to a single claim would be part of a work packet that may move through various user stations to review and process. The workflow would comprise the flow of work and actions that are performed on the documents or workflow packet by multiple users in the system.

The workflow defines the sequence and boundaries of how the work is performed with respect to the documents in the workflow packet, and any restrictions on the order in which documents in the workflow packet must be processed. For instance, before the claim can proceed to a further step, a claims adjuster might be required to ensure that certain documents are included in the workflow packet for the claim before the workflow packet can proceed to further nodes in the workflow, e.g., determining the amount of compensation.

In workflow terminology, a worklist is a queue of work items. Each work item comprises a unit of work for a node in the workflow that is performed by the users associated with that node. Each work item may be associated with one work packet, which comprises documents or objects that are processed during the work defined for that work item. When a user at one node accesses the work item to perform the work define therein, that work item is locked, thereby preventing others at that node from accessing the work item.

A worklist, which is a queue of work for the users of the organization to perform with respect to the workflow packet. The work items within the worklist can be handled by any of the employees/users assigned to the worklist. An action list defines the actions that a user can perform on the work packet objects associated with the work item, such as selections or data that may be entered in the work packet. For example, an adjuster in the claim process workflow can select an option to continue consideration of the claim if it appears valid or select an option to reject the claim. The workflow further consists of the paths defined as the connections between nodes which indicate the order of execution of nodes in the workflow.

An action list may be associated with a workflow that provides a list the actions that can be invoked at the nodes in the defined workflow. The actions may comprise programs that are executed at a particular node. In certain implementations, the actions comprise Java methods that the workflow server 6 executes when control proceeds to the node with which the method is associated. Action in the list would be associated with particular nodes. An access list defines a mapping of users that can be assigned to nodes to perform the action associated with such node. An notification feature causes a message to be sent to a specified user if the user associated with a node has not performed the action define for the node within a specified time frame.

One or more actions and a user with are associated with the work nodes in the workflow. The work nodes defined for the workflow may comprise a decision point node, collection point node, document node, and assign value node. A decision point node causes the workflow to proceed along a branch of execution based on selection by the user or some other action taken by an external application called at a previous work node. For instance, the path taken to the next node in the workflow may vary if the claim adjuster selects to reject the claim as opposed to approving the claim. A collection point node is a work node where certain documentation is gathered and added to the work packet. The collection node holds and manages work packages that cannot be processed completely until additional information is received. A document node represents a document in the workflow.

Figure 2:
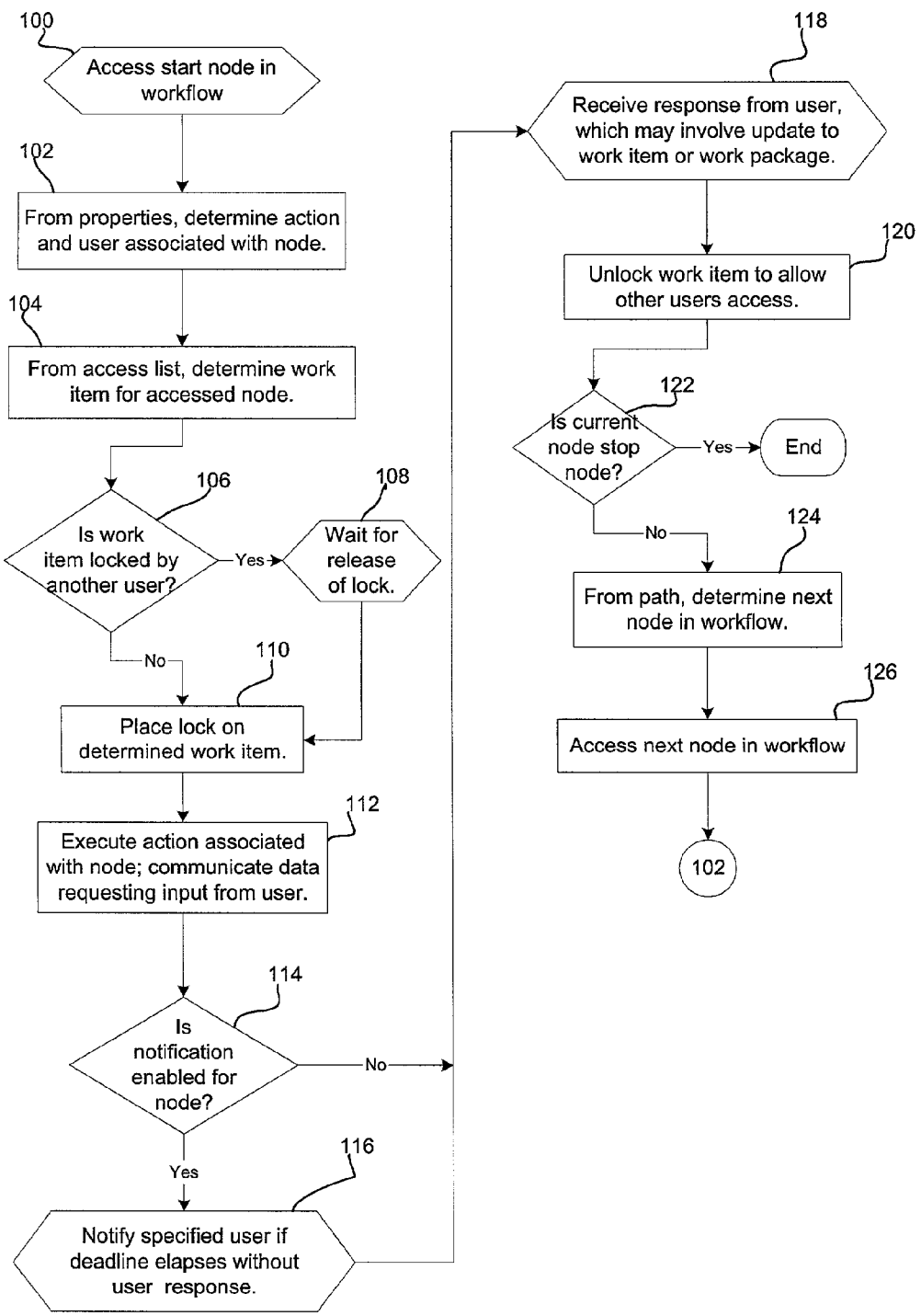
FIG. 2 illustrates logic performed by a workflow server to execute a workflow in accordance with implementations of the invention.

In certain implementations, the workflow model 24 defined using the buildtime program 22 is document centric in that the actions performed at the node concern the processing of work packages that may comprise any content or object that is processed and routed through the workflow. FIG. 2 illustrates the logic performed by the workflow server 6 to execute a workflow. When a user invokes a workflow stored in the runtime database 4, the workflow server 6 accesses (at block 100) the start node of the invoked workflow by interacting with the runtime database 4 in a manner known in the art. From the properties define for that node, the workflow server 6 determines (at block 102) the actions and user associated with the node. The workflow server 6 further processes (at block 104) the access list define for the workflow to determine the work item for the accessed node. If (at block 106) the determined work item currently accessed in the workflow is locked by another user at that node, then the workflow server 6 waits (at block 108) for the lock on the work item(s) to be released. If the work item is not locked or after the lock is released, control proceeds to block 110 where the workflow server 6 places a lock on the determined work item. The workflow server 6 then executes (at block 112) the action associated with the node and communicates data to the workflow client 12 of the determined user requesting user action.

If (at block 114) notification is enabled for the current node and the deadline has passed (at block 116) without receiving a response from the user, then the workflow server 6 notifies the user specified with the enable notification that the deadline has passed. Upon receiving (at block 118) a response from the user, which may comprise entering information, modifying a work item, adding a work item to the work package, selecting an option, etc., the workflow server 6 unlocks (at block 120) the work item(s) previously locked for the user. If (at block 122) the current node is the stop node, then control ends; otherwise, if there are further nodes to process in the workflow, then the workflow server 6 determines (at block 124) from the path from the current node the next node in the workflow and accesses (at block 126) the next node. Control then proceeds back to block 326 to process the next node.

The workflow logic of FIG. 2 provides a document centric workflow in that the state of processing work items associated with the node controls the workflow because control cannot proceed to other subsequent nodes that process the locked work item until the node holding the lock completes execution and releases the lock on the work item. Thus, access to work items controls the flow through the workflow.

With the described implementations, the workflow builder 20 generates a WDL file 10 that may be compatible with workflow engines from different vendors because different vendors may design their workflow engines to be compatible with the WDL format of the WDL file 10. This allows the workflow model define in the WDL file 10 to be transportable across different vendor workflow engine platforms.

Object Oriented Workflow Architecture

Figure 3:
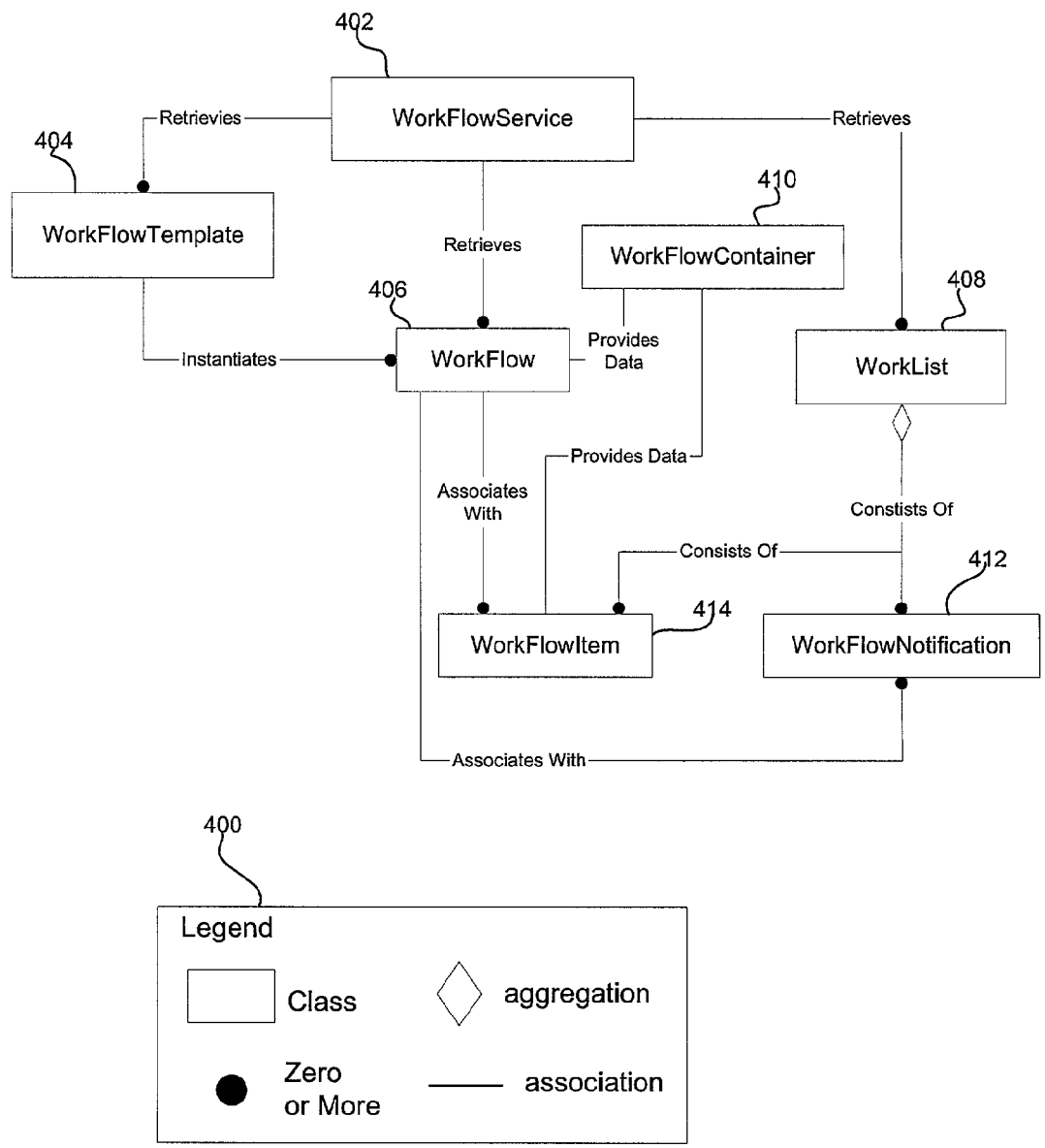
FIG. 3 illustrates an architecture of object oriented classes for implementing a workflow in accordance with implementations of the invention.

FIG. 3 illustrates an architecture of object oriented classes and their interrelationship that are used to implement a workflow of nodes. As indicated in the legend 400, a rectangle indicates a class; a line connecting classes indicates an association of the connected classes; a line connecting classes terminating in a filled circle indicates that there may be one or more instances of the class at the end with the circle for each instance of the class at the other end of the line; and a line terminating at a diamond indicates that the class at the diamond end is an aggregate, such that the aggregate object is made up of one or more instances of the class at the other end of the line. FIG. 3 illustrates the relationship of the classes.

The WorkFlowService class 402 is the starting point for a user wanting to access a workflow. The WorkFlowService class 402 includes methods that allow users to access already define workflow templates and executing workflows. The WorkFlowService class 402 is associated with the WorkFlowTemplate 404, WorkFlow 406, and WorkFlowList 408 classes. The WorkFlowTemplate class 404 provides methods that allow the user to manipulate workflow process template objects, e.g., process template 8 (FIG. 1), which comprise a define workflow that is stored in the workflow engine 2. The WorkFlow class 406 provides methods that allow the user to access information and control an executing workflow. The WorkList class 408 includes methods that allow the user to access an executing work list object comprised of work items and information on the current state of the executing work list, i.e., information on work items being processed. The methods in the WorkFlowService class 402 are used to retrieve information on particular workflows, workflow templates, and workflow lists associated with a particular workflow service. The methods from the other classes, such as the WorkFlowTemplate 404, WorkFlow 406, and WorkFlowList 408 classes, can then be used to obtain specific information and control over those workflow templates, workflows, and workflow lists identified by the WorkFlowService class 402 methods.

The WorkFlowTemplate class 404 provides information on a workflow template. A workflow object from the WorkFlow class 406 represents an executing workflow. The WorkFlowContainer class 410 includes methods to instantiate a container object that includes information on one container used to transfer data between nodes. Users at nodes may access data in the container and update the container with additional data. The data in the container may be used by the action being executed at a node. The WorkFlow class 406 is associated with the WorkFlowNotification class 412, which is used to provide notifications, such as notifications if a user does not perform an action at a node within a predefined time period. There may be many notifications provided for one workflow. The WorkFlow class 406 is further associated with the WorkFlowItem class 414, such that one executing workflow may be associated with one or more work items indicating a unit of work to perform for a node within the workflow. The WorkFlowItem class 414 is associated with the WorkFlowContainer class 410, such that one container may be used at a work item to provide data to the user executing the unit of work defined by the work item. The relationship between the WorkFlow class 406 and the WorkFlowItem class 414 indicates that there may be many work item objects associated with one executing workflow. The class architecture of FIG. 3 further illustrates that a workflow list of the WorkFlowList class 408 is an aggregate of the workflow from the WorkFlow 414 Item class and workflow notifications from the WorkFlowNotification 412 class.

The above object oriented architecture of FIG. 3 defines how the different classes interrelate in order to implement a workflow. Each of the above interrelated classes 402, 404, 406, 408, 410, 412, and 414 provides interfaces/methods that may be used within a workflow computer program to implement the workflow and actions performed at a node. The workflow program would be executed by the workflow server 6 (FIG. 1) in the workflow engine 2.

Following are examples of some methods of the WorkFlowService class 402, including:

WorkFlowService(): constructs a new workflow service, which provides access to different workflow services in the workflow engine 2 (FIG. 1). Each workflow service is associated with workflow templates, executing workflows, and workflow lists of work items for a workflow.

connect: provides a user name, authentication, and connection string to use to authenticate a user to provide access to a requested workflow service, which allows access to workflow templates, work lists, etc.

connection: handle returned to a user to allow access to a particular workflow service.

setDatastore: a reference to a data store including documents and objects used by the work items in the workflows associated with the workflow service. Thus, different workflows for a workflow service may process documents within workflow packages from the same data store.

listWorkFlows: returns a list of all workflow objects of the WorkFlow class 406.

listWorkLists: returns a list of all work list objects of the WorkFlowList class 408.

listWorkFlowTemplates: returns a list of all template objects of the WorkFlowTemplate class 404.

Following are examples of some methods of the WorkFlowService class 402, including:

WorkFlowTemplate(): constructs a workflow template object including a defined workflow. This workflow template may be created using the GUI panels and buildtime program described above.

name: returns name of a workflow template.

description: returns a description of the work performed by a workflow template.

modifiedTime: time the workflow template was last modified.

Following are examples of some methods of the WorkFlow class 406, including:

WorkFlow(): constructs a workflow object representing a workflow comprised of nodes and work items for a specified workflow. The workflow may also be provided a container that is used to allow users of different work items to communicate and/or a work packet comprised of one or more documents or objects to be processed as part of the workflow.

get/setName: returns or sets the name for a workflow.

workFlowTemplateName: returns the name of the workflow template associated with the workflow.

notificationTime: returns the time of the last notification generated for the workflow in response to a user not performing an action for one accessed node within a specified time period.

modifiedTime: Returns the last time the workflow was modified.

stateChangeTime: returns the last time a state change occurred with the workflow:

startTime: returns the time the workflow was started.

endTime: returns the time the workflow ended.

state: returns a state of the workflow, such as ready, running, finished, terminated, suspended, terminating, suspending, deleted, etc.

inContainer: returns the input container associated with the workflow.

start: starts a workflow with a container if the state is ready.

terminate: terminates the workflow if the state is running, suspended, or suspending.

suspend: suspends the workflow if the state is running.

resume: resumes a suspended workflow if the state is suspended and suspending.

add: adds a workflow to the system that is associated with one specified workflow template.

Following are examples of methods of the WorkFlowContainer class 410, which instantiates a container object used with a workflow to transport information among the nodes.

WorkFlowContainer(): constructs a container object for a container used within a particular workflow.

get/setPriority: get/sets the priority for an item in the container.

get/setActivityNode: get/sets the current node being processed, may also get/set information on the current activity node.

get/setWorkPacketID: get/sets an identifier of a work packet being routed through the system.

get/setActionPerformed: get/sets information on an action being performed.

get/setUserVariable: get/sets a variable maintained in the container, that may have predefined values. The priority is maintained for a user variable in the container.

retrieve: retrieves and refreshes the container.

update: updates the container data.

Following are examples of some methods of the WorkList class 408, where a work list object is a representation of a work list in the system. As discussed, a work list object comprises a collection of work items and notifications for an executing workflow.

WorkList(): constructs a work list object for a specified work list. A work list consists of work items.

get/set ACLName: get/sets the action control list (ACL) name for the work list including the actions that may be performed as part of units of work for the work list.

listWorkItems: lists the work items on the work list.

listWorkItemsByTemplate: returns the work items for the work list by the specified workflow template name.

listWorkItemsByNode: returns a list of the work items assigned to each node in the work flow.

listProcessNotifications: lists notifications generated during workflow that are associated with the workflow process. For instance, the notification may provide a general notification for the workflow. In certain implementations, a notification process is activated and performed as a background process to generate notifications.

listActivityNotifications: lists notifications generated during workflow that are associated with a particular activity, such as a user not performing an activity within a specified time. For instance, the notification may enable notifications for activities at particular nodes.

add/update/delete/retrieve: separate commands that allow user to add, update, delete, and retrieve a work list.

Additional commands may be provided to access the information in the work list, such as filter commands to provide filters for accessing information from the work list, thresholds of the number of items that can be in the work list, etc.

Following are examples of some methods of the WorkFlowItem class 414, where a work item object represents a unit of work performed in the workflow. The following methods are used to create and modify work items, and obtain information thereon.

WorkFlowItem(): constructs a work item for a specified workflow, node, and owner.

name: returns the name of the node to which the work item is assigned.

state: returns a state of the work item, such as not set, ready, running, finished, terminated, suspended, disabled, checked out, in error, executed, etc. A work item is checked out when a user has accessed the work item to perform the actions defined for the work item.

workFlowName: returns the name of the workflow including the work item.

workFlowTemplateName: returns the name of the workflow template including the work item.

priority, owner, notificationTime, startTime, creationTime, modifiedTime: methods that return information on the priority, owner, time of last notification, time of creation and time of last modification for a work item, respectively.

retrieve, start, finish: methods used to retrieve, begin executing, and complete a work item, respectively.

checkIn, checkOut: checkOut locks a work item to prevent other users at a node from accessing the work item and changes the state of the work item to checked out. Upon check out, the container associated with the work item is accessed from the previous node using the inContainer method. The checkIn method receives the completed work item from the user, releases the lock, and provides the container to route to the next node.

inContainer: method that obtains container from previous node for use with work item checked out at current node being processed.

outContainer: method generates an out container to include contents of container user accessed at work item, including any changes made by the user to the data in the container. A handle of the out container is generated and provided with checkOut method called for the next node to provide that container to the user of the next node in the workflow.

Following are examples of some methods of the WorkFlowNotification class 412, where a notification object represents a generated notification. The following methods are used to create and modify notifications, and obtain information thereon.

WorkFlowNotification(): constructs a notification object having a specified notification name, notification type, and owner name for a specified workflow service and workflow. The notification type indicates how the owner is notified state: returns a state of the notification, such as not set, ready, running, finished, terminated, suspended, disabled, etc.

priority, owner, notificationTime, startTime, creationTime, modifiedTime, receivedTime: these methods return the priority of the notification, owner of the notification, time that must elapse before the notification is generated, time the notification started, time the notification was crated, time of last notification to the notification, time the notification was received, respectively. The notification would be started and executed as a background process.

receiveReason: returns a received reason for the notification.

retrieve, cancel: methods that retrieve and cancel a notification, respectively.

transfer: transfers a notification to a specified user. In this way, a notification can be transferred from the current owner to some other user.

The above described methods and classes would be included in a workflow program executed by the workflow server 6 (FIG. 1) to execute the workflow. The methods described above would be used to access and modify the workflow related objects, such as the workflow, work items, notifications, containers, etc. when running the workflow. The above described methods may also be used in other programs that can obtain information and status on a workflow.

Figure 4:
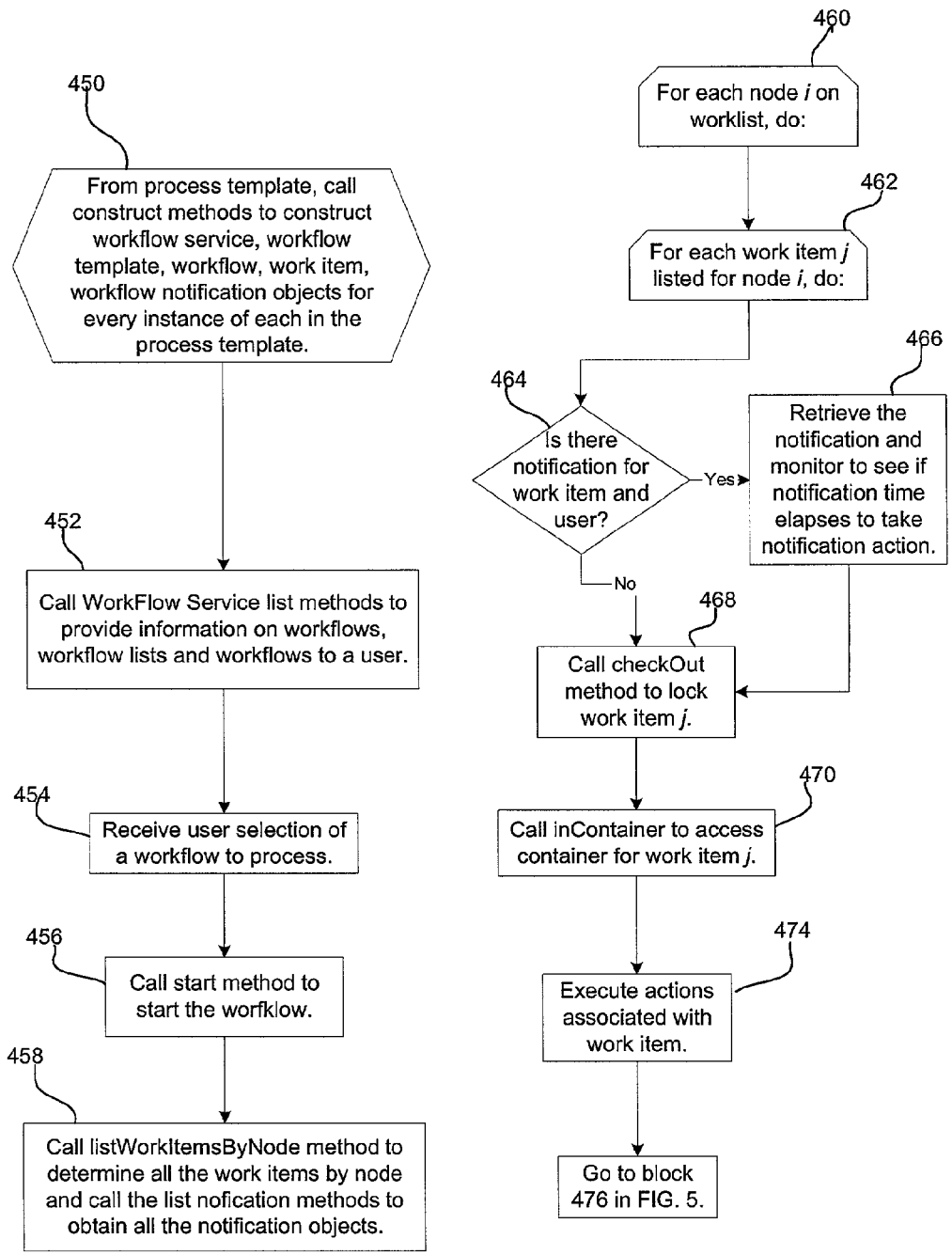
FIGS. 4 and 5 illustrate logic to utilize the methods and objects from the object oriented class architecture of FIG. 3 to execute a workflow in accordance with implementations of the invention.
Figure 5:
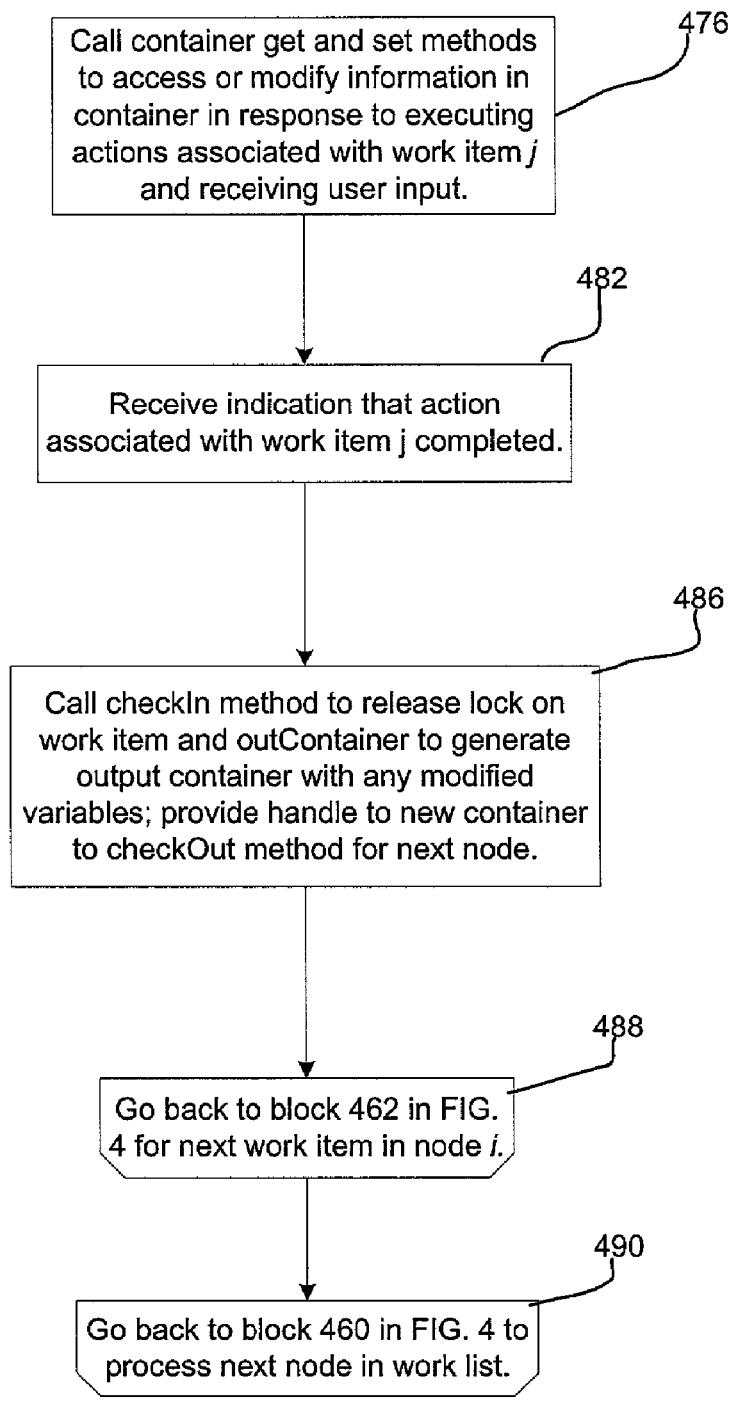

FIGS. 4-5 illustrate an example of program logic in a workflow program executed by the workflow server 6 (FIG.

1) utilizing the above discussed methods to implement a workflow. With respect to FIG. 4, control begins at block 450 where the program calls the constructor methods, WorkFlowService() to construct a workflow service object. The workflow program would then call (at block 452) the WorkFlowService list methods, such as listWorkFlows, listWorkLists, listWorkFlowTemplates, to obtain information on the workflows, workflow templates, and work lists for a workflow service. This information may then be presented to a user for selection. Various other methods in the classes may be called to access information on the workflow to present to the user when making a decision on which workflow to execute.

At block 454, user selection of a workflow to process is received. The workflow program then calls (at block 456) the WorkFlow start method to start the workflow. The workflow program then calls (at block 458) the listWorkItemsByNode method to obtain all the work items for the started workflow, and the nodes to which the one or more items are associated. The workflow program then performs a loop at blocks 460 through 490 for each node i in the workflow, as determined from the list of work items by node. For each node i, the workflow program performs a loop at block 462 to 488 for each work item j associated with node i. If (at block 464) there is a notification for the work item and the user that is the owner of the item, as determined from the methods, then the workflow program retrieves (at block 466) retrieves the notification and then starts a monitor to determine if the time period for the notification has elapsed without the work item completing. From block 464 or 466, the workflow program calls (at block 468) the checkOut method to lock the work item j. The inContainer method is called (at block 470) to access any container associated with the work item j. Once the work item j is locked, the workflow program then executes (at block 474) the actions associated with the work item j.

Control then proceeds to block 476 in FIG. 5, where the workflow program calls container get and set methods to access or modify the data and variables in the container accessed for the work item j in response to executing actions assigned to that work item j. For instance, as part of performing actions for a work item, the user of the work item may read and write data to the container. The workflow program receives (at block 482) indication from a user that the actions associated with the work item have completed. The workflow program further calls (at block 486) the checkin method to release the lock on the work item j and the outContainer method to generate a new container including any updates to provide to the user at the next node in the workflow. The handle to the new container would be used in the next called checkOut method to provide the container to the user at the next node of the workflow. If there are further work items for the node i, then control proceeds (at block 488) back to block 452 to retrieve the next work item. After completing all the work items for node i, control proceeds (at block 490) back to block 460 to process the next node in the work list.

The above described logic utilized workflow related classes and the methods therein to implement a workflow and obtain information thereon. The workflow server 6, or some other component in the workflow engine 2 (FIG. 1), would then translate the workflow objects and methods into application specific commands, such as Structured Query Language (SQL) commands to manipulate the data in the runtime database 4 and process template 8 to obtain information on the workflow and implement workflow operations.

Load Balancing the Distribution of Work Items

As discussed, when transitioning between nodes, the workflow server 6 (FIG. 1) would forward a work item to a next node to users that are members of an access list. In certain implementations, the workflow server 6 may determine how to distribute work items to members of the access list according to a load balancing technique that tends to distribute work items to those whose current workload is relatively lighter.

In certain implementations, methods would be provided to allow a user instantiating a workflow to define a priority scheme for that workflow. In certain implementations, in defining the priority scheme, the user would specify ranges of priority values, which are typically integer values, to specific predefined ratings. FIG. 6 illustrates an example of a user defined priority scheme 500, where the user defined priorities 502 map to the predefined ratings 504. Each user instantiating a workflow may set different user defined priority values for the predefined ratings 504. In this way, users may individualize the selectable priority values 502 that will be used to assign a priority to a workflow or element within the workflow. However the predefined ratings 504 that remain the same across all priority schemes 500 provide normalized values that enable a comparison of priority among users that have defined different priority values for the predefined ratings.

Once a priority scheme 500 is defined for a workflow, the user instantiating the workflow would then set a global priority from the user defined priority values 502 to apply to that workflow. All work items assigned to users at nodes within the workflow are assigned the global priority value set by the user instantiating the workflow. Additionally, users with appropriate permission may alter the global priority of a workflow during execution of the workflow.

Figure 7:
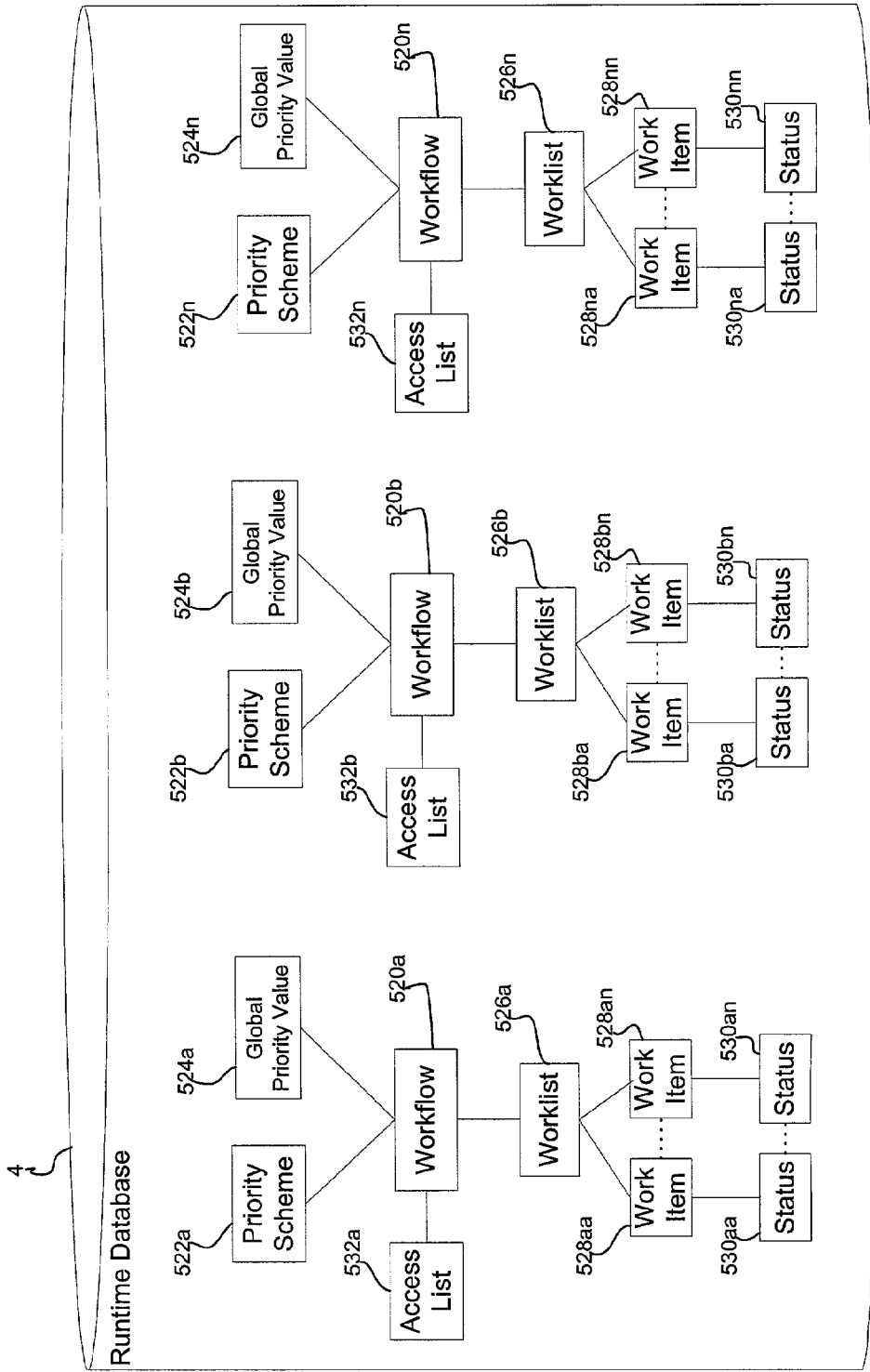
FIG. 7 illustrates an arrangement of workflow related data in the runtime database in accordance with implementations of the invention.

FIG. 7 illustrates the relationship of the workflow data structures maintained in the runtime database 4 (FIG. 1). As discussed, the runtime database 4 includes a plurality of active or instantiated workflows 520a, b . . . n. For each workflow 520a, b . . . n there is a user defined priority scheme 522a, b . . . n, such as the priority scheme 500 (FIG. 6) and a user selected global priority value 524a, b . . . n. Further, for each workflow 520a, b . . . n, there may be a worklist 526a, b . . . n that identifies the work items 528aa . . . an, ba . . . bn, etc. defined for the workflow 520a, b . . . n, where there may be any number of work items defined for the workflow 520a, b . . . n that comprise the work actions performed at the nodes of the workflow 520a, b . . . n. Status 530aa . . . an, ba . . . bn, etc. is provided for each work item 528aa . . . an, ba . . . bn, etc. As discussed above, the status 530aa . . . an, ba . . . bn, etc. of a work item includes the state of the work item, which indicates whether the work item is set, ready, running, finished, terminated, suspended, disabled, checked out, in error, executed, etc. Further, as discussed above, a work item is checked out when a user has accessed the work item to perform the actions defined for the work item.

Each workflow 520a, b . . . n further includes an access list 532a, b . . . n, as discussed above, which identifies those users who have permission to access the work items for the nodes defined in the work flow. Additionally, multiple access lists of different users may be provided for one workflow to provide different groups of users access to different nodes in one workflow 520a, b . . . n In the described implementations, to select a user that is a member of the access list 532a, b . . . n of the workflow 520a, b . . . n, the workflow server 6 (FIG. 1) would calculate a workload index for each user that indicates the degree to which other work items 528*aa* . . . *an*, *ba* . . . *bn*, *na* . . . *nn* are assigned to the user and the priority of such assigned work items. In certain implementations, the workload index is based on the global priority values 524*a*, *b* . . . *n* assigned to the workflows including the work items 528*aa* . . . *an*, *ba* . . . *bn*, *na* . . . *nn* assigned to the user. The workflow server 6 would select one user having the lowest workload index. If two or more users have a same workload index, then the workflow server 6 may select the user having the fewest number of assigned work items 528*aa* . . . *an*, *ba* . . . *bn*, *na* . . . *nn*.

Figure 8A:
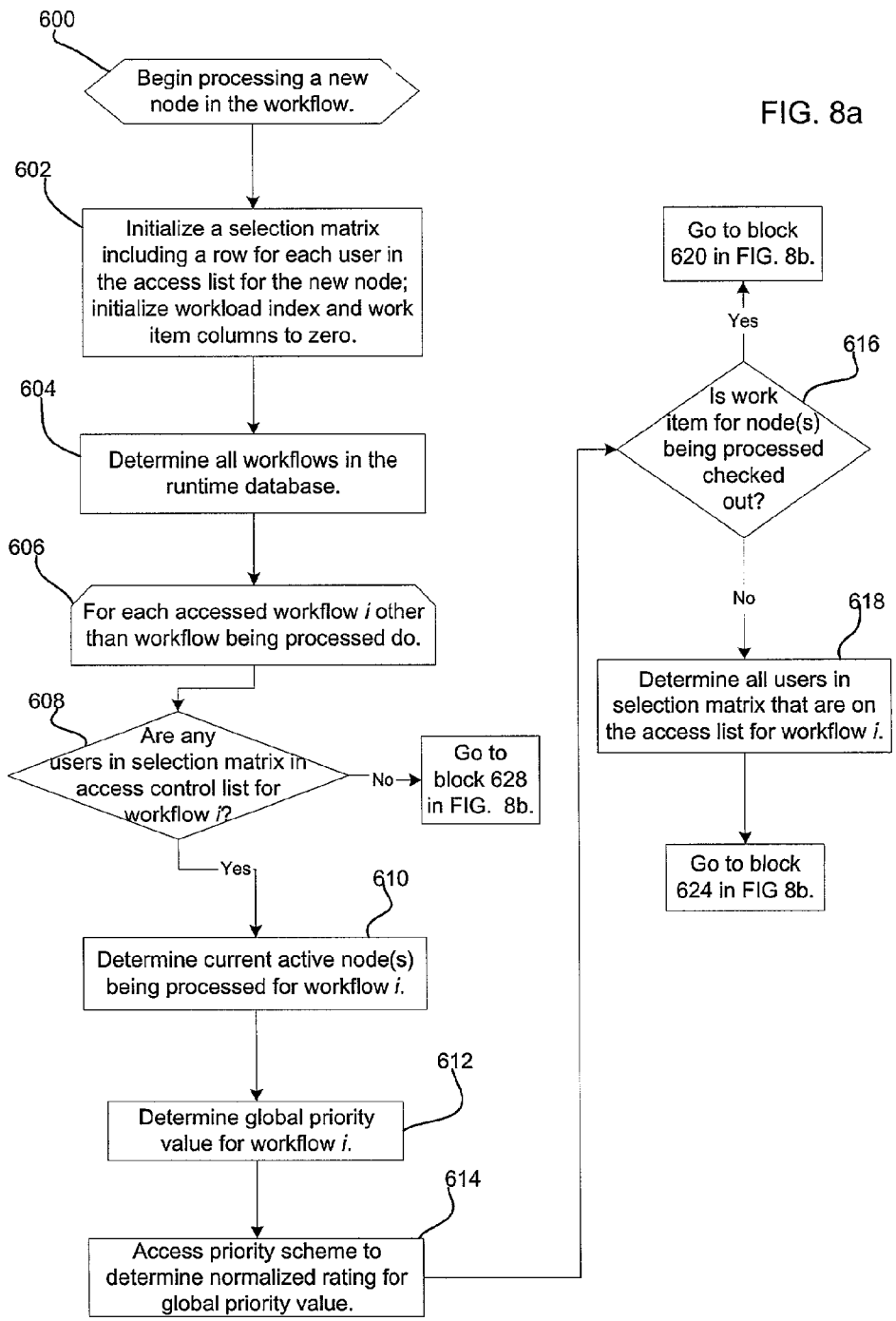
FIGS. 8a, b illustrate logic implemented in the workflow server to select one user to assign a work item in accordance with implementations of the invention.

FIGS. 8*a*, *b* illustrate logic implemented in the workflow server 4 (FIG. 1) to select one user to assign the work item 528*aa* . . . *an*, *ba* . . . *bn*, *na* . . . *nn* when processing a new node in the workflow 520*a*, *b* . . . *n*. A new node may be processed after completing a previous node in the workflow. Upon proceeding to process (at block 600) a new node in the workflow 520*a*, *b* . . . *n*, the workflow server 6 initializes (at block 602) a selection matrix including a row for each user in the access list 532*a*, *b* . . . *n* for the workflow being processed and one column for a workload index value and another column for a number of work items 528*aa* . . . *an*, *ba* . . . *bn*, *na* . . . *nn* assigned to the user.

Figure 9:
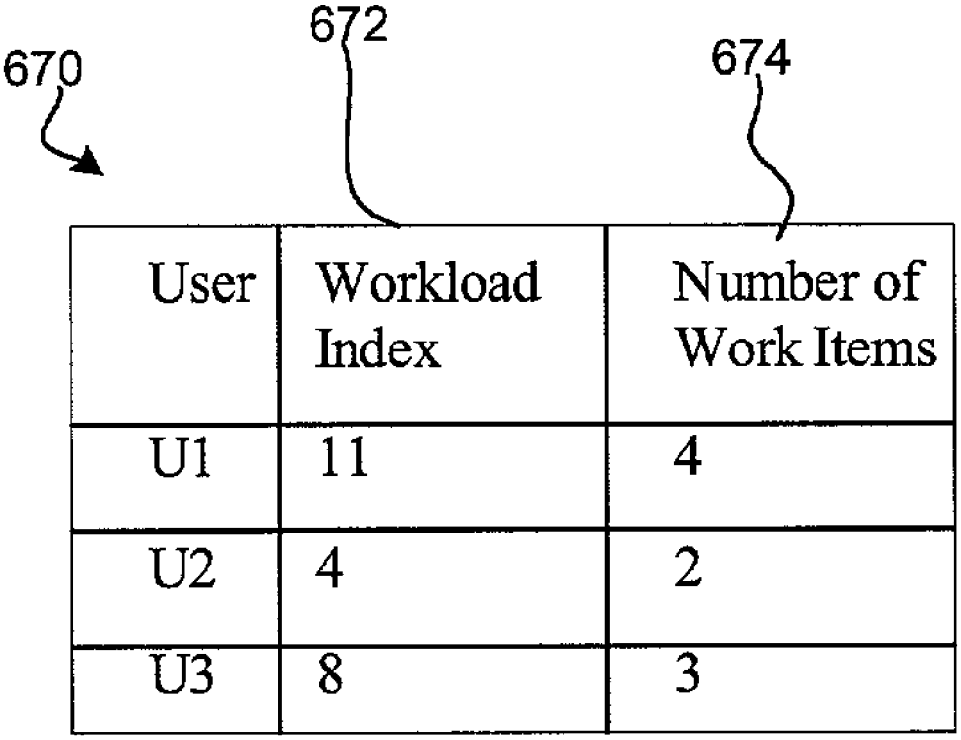
FIG. 9 illustrates an example of a selection matrix used to select one user to assign the work item in accordance with implementations of the invention.

FIG. 9 illustrates an example of a selection matrix 670, including a column 672 for the workload index of each user U1, U2, U3, which comprises the sum of all normalized ratings of work items assigned to the user and a column 674 indicating the number of work items assigned to the users U1, U2, U3. A work item 528*aa* . . . *an*, *ba* . . . *bn*, *na* . . . *nn* is assigned to a user if work item status 530*aa* . . . *an*, *ba* . . . *bn*, *na* . . . *nn* indicates that the user is the owner of the work item 528*aa* . . . *an*, *ba* . . . *bn*, *na* . . . *nn* as a result of checking out the work item. Additionally, if the work item is not checked out or owned by one user, then all users on the access list 532*a*, *b* . . . *n* associated with the workflow 520*a*, *b* . . . *n* are assigned that work item 528*aa* . . . *an*, *ba* . . . *bn*, *na* . . . *nn*.

Figure 8B:
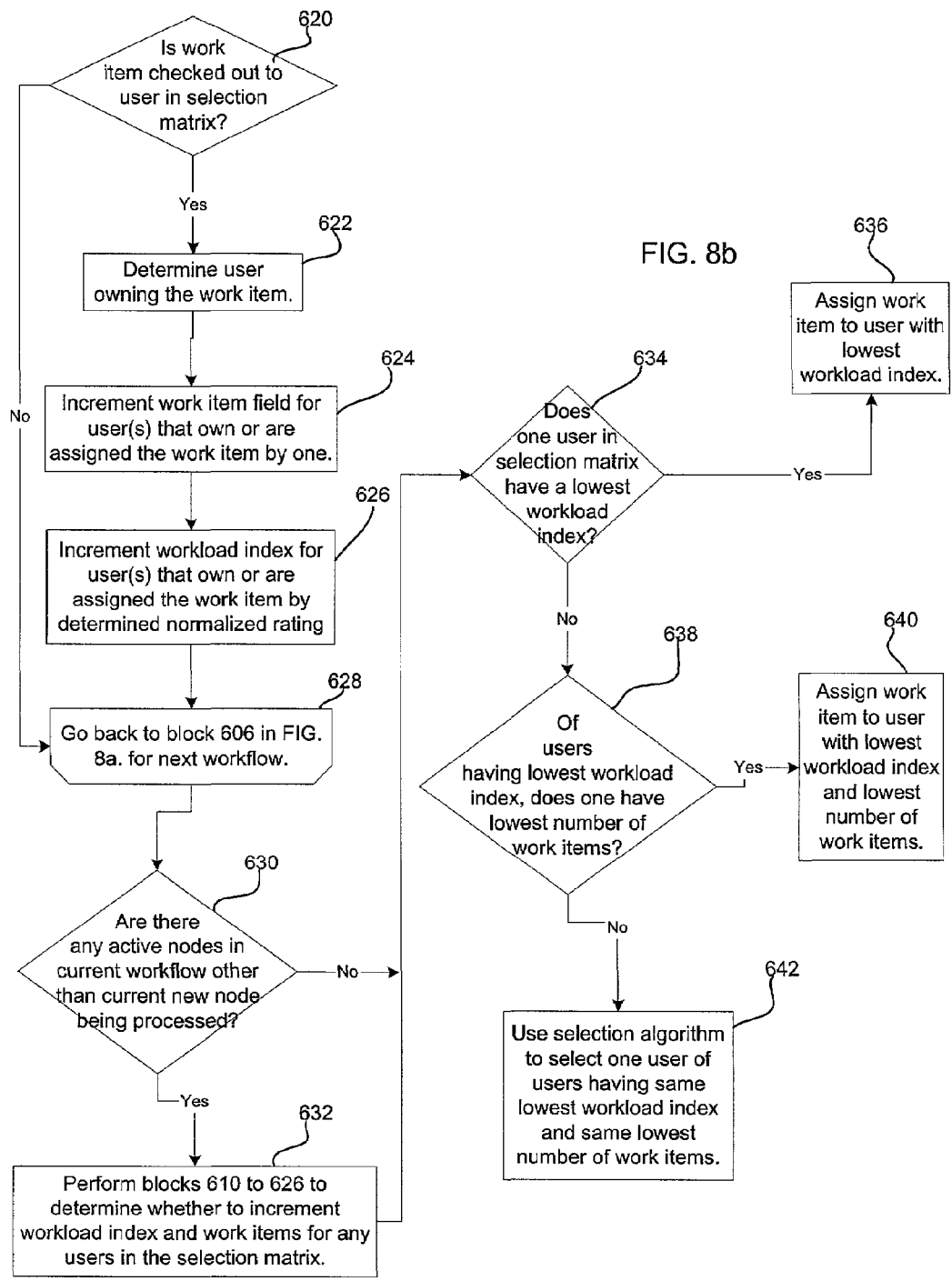

The workflow server 6 determines (at block 604) all the workflows instantiated in the runtime database 4. For each instantiated workflow i, the workflow server 6 performs a loop at blocks 606 through 628 in FIG. 8*b* to calculate the workload index 672 and number of work items 674 for each user in the access list 532*a*, *b* . . . *n*. At block 608, the workflow server 6 determines whether any users listed in the selection matrix 670 are in the access list 532*a*, *b* . . . *n* for workflow i. If not, control proceeds to block 628 (FIG. 8*b*) to consider the next workflow instantiated in the runtime database 4. Otherwise, if so, then the workflow server 6 determines (at block 610) the current active node or nodes for workflow i. At blocks 612 and 614, the global priority value 524*a*, *b* . . . *n* is determined for workflow i and the normalized rating for the determined global priority value 524*a*, *b* . . . *n* is determined from the priority scheme 522*a*, *b* . . . *n*, such as the priority scheme shown in FIG. 6.

If (at block 616) the work item for the node(s) being processed in workflow i are not checked out or owned by one user, then the workflow server 6 determines (at block 618) all users in the selection matrix 670 that are also on the access list for workflow i, i.e., are capable of being assigned the active work item for workflow i. If (at block 616) the work item 528*aa* . . . *an*, *ba* . . . *bn*, *na* . . . *nn* for the active node in workflow i is checked out, then one user is the owner of the work item 528*aa* . . . *an*, *ba* . . . *bn*, *na* . . . *nn*. In the case the work item 528*aa* . . . *an*, *ba* . . . *bn*, *na* . . . *nn* is checked out and if (at block 620 in FIG. 8*b*) the work item 528*aa* . . . *an*, *ba* . . . *bn*, *na* . . . *nn* is owned by one user listed in the selection matrix 670, then control proceeds to block 622 in FIG. 8*b* where the workflow server 6 determines the one or more users in the selection matrix 670 owning the work item 528*aa* . . . *an*, *ba* . . . *bn*, *na* . . . *nn*. For the one or more users determined to be assigned the work item at block 618 (FIG. 8*a*) or block 622 (FIG. 8*b*), the workflow server 6 increments (at block 624) the work item field for the determined user(s) in column 674 by one and increments (at block 626) the workload index in column 672 for the determined user(s) by the determined normalized rating for the workflow i. Control then proceeds (at block 628) back to block 606 in FIG. 8*a* to consider the next determined workflow 520*a*, *b* . . . *n* in the runtime database 4.

In addition to considering work items assigned to users in the selection matrix 670 in other workflows 520*a*, *b* . . . *n*, there may also be active work items 528*aa* . . . *an*, *ba* . . . *bn*, *na* . . . *nn* assigned to users in the current workflow being processed. If (at block 630) there are active nodes in the current workflow than the current new node being processed, then the workflow server 6 performs the operations at blocks 610 through 626 to assign the normalized rating for each other work item assigned to members of the access list 532*a*, *b* . . . *n* of the workflow 520*a*, *b* . . . *n* including the new node being processed.

After completing the selection matrix 670, the workflow server 6 uses the selection matrix 670 to select one user to assign the new work item being processed. If (at block 634) one user in the selection matrix 670 has a lowest workload index 672 value, then the workflow server 6 assigns (at block 636) the work item to such user. If two or more users have the same workload index value, then a determination (at block 638) is made of whether one user has the least number of assigned work items 528*aa* . . . *an*, *ba* . . . *bn*, *na* . . . *nn* as indicated in column 674 of the selection matrix 670 (FIG. 9). If so, the workflow server 6 assigns (at block 640) the work item 528*aa* . . . *an*, *ba* . . . *bn*, *na* . . . *nn* to such user. Otherwise if more than two users have a same workflow index 672 and number of work items 674, then the workflow server 6 would apply (at block 642) some other selection algorithm to arbitrarily select one of the users having the same workflow index and number of work items.

With the described implementations, the workflow server 6 assigns the work item to only one user on the access list for the new node being processed. In this way, other unselected users are not burdened with being notified of another work item to process. Further, the selection of one user to receive the work item 528*aa* . . . *an*, *ba* . . . *bn*, *na* . . . *nn* is based on the normalized priority of the work items the users are currently processing, with the goal of selecting the user having the lowest rating, i.e., processing the fewest number of work items for the assignment. In this way, new work items are directed toward the users having the lightest load of assigned work items in a manner that balances the distribution of work items to users. Moreover, improving load balancing of work items to users will increase the likelihood that work items are completed faster, thereby improving the performance of the overall workflow process.

Additional Implementation Details

The preferred embodiments may be implemented as a method, apparatus or article of manufacture using standard programming and/or engineering techniques to produce software or code. The term "article of manufacture" as used herein refers to code or logic implemented in a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the workflow server 6 performed the load balancing operations to determine the user to assign the work item. In alternative implementations, a set of APIs may be provided to allow workflow clients 12*a, b, c* (FIG. 1) or some other program to call the workflow server 6 to perform the load balancing operations described in FIGS. 8*a, b*. In this way, the clients 12*a, b, c* or other program would use the APIs to select one user with a minimum workload to assign the work item.

The described implementations utilized specific methods to determine the work items assigned to users that are members of the access list of the new node being processed. However, in workflow architectures utilizing different methods and data structures for maintaining information on workflows and work items, alternative determinations may be made to identify the work items assigned to each user in the access list of the new node being processed.

In additional implementations, there may be multiple access lists for different nodes within one workflow. In such case, the workflow server 6 would have to consider access lists on a node-by-node basis, as opposed to a workflow basis.

In the described implementations, one user was assigned the work item for the new node. In alternative implementations, multiple users may be assigned the work item, and the user requesting to check out or own such work item would then be provided the work item to complete.

In the described implementations, a priority assigned to the workflow and the number of work items assigned to a user were used to select the user to assign the new work item. However those skilled in the art will appreciate that there are alternative ways to calculate the workload index. For instance, in one alternative implementation, the workload index may be based on the number of work items assigned to each user without regard to any priority assigned to the workflow including the assigned work items. Still further, the workload index may be based on a priority assigned on a node-by-node basis, instead of on a workflow basis.

In the described implementations, the actions were implemented as Java methods. Alternatively, the actions may be implemented in any programming language known in the art.

In the described implementations, the priority was set by a user instantiating the workflow. Alternatively, the priorities for different workflows may be set prior to instantiation.

The foregoing description of the preferred embodiments of the invention has been presented for the purposes of illustration and description. It is not intended to be exhaustive or to limit the invention to the precise form disclosed.

Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for assigning a work item for one of a plurality of nodes in a workflow to at least one of a plurality of users capable of performing workflow related operations at the nodes, comprising:

processing a node in a current workflow, wherein a current work item is associated with the processed node;

processing an access list indicating users capable of being assigned the current work item;

determining from the access list at least one user capable of being assigned the current work item;

for each determined user, determining a number of work items other than the current work item assigned to the user in the current workflow and in a workflow other than the current workflow;

using a load balancing technique that considers the number of work items assigned to the at least one determined user on the access list in the current and the other workflows to select at least one determined user based on the determined number of work items assigned to the determined users; and assigning the current work item to the at least one selected determined user.

2. The method of claim 1, wherein the determined number of work items assigned to each user includes active work items assigned to the user in workflows other than the current workflow.

3. The method of claim 2, wherein the determined number of work items further include active work items assigned to the user in the current workflow other than the current work item.

4. The method of claim 1, wherein the determined users comprise users on the access list associated with the current workflow.

5. The method of claim 1, wherein determining the number of work items assigned to each user further comprises:

determining work items for which the user has exclusive access; and determining work items that are not owned by another user and that are associated with an access list that includes the user.

6. The method of claim 1, wherein using the load balancing technique to select at least one determined user based on the determined number of work items assigned to the determined users further comprises:

for each work item assigned to the user, determining a priority related to the work item;

for each user calculating an index based at least on each priority related to each work item assigned to the user; and using the index to select one user to assign a new work item.

7. The method of claim 6, wherein the priority related to the work item comprises a priority assigned to the workflow in which the work item is included.

8. The method of claim 6, further comprising:
receiving a user defined priority, wherein the user defined priority is the priority related to the work item.

9. The method of claim 8, wherein the user defined priority is for the workflow including the work item assigned to the user.

10. The method of claim 6, further comprising:
receiving a user defined priority scheme associating a plurality of user defined priorities with a plurality of normalized ratings; and
determining a user defined priority related to the work item, wherein the determined priority related to the work item used to calculate the index comprises the normalized rating associated with the user defined priority.

11. The method of claim 6, wherein the selected user comprises the user having a lowest index value.

12. The method of claim 11, further comprising:
if no one user has the lowest index value, determining from the users having a same lowest index value one user having a least number of assigned work items, wherein the determined user having the least number of assigned work items comprises the selected one user.

13. The method of claim 6, further comprising:
using an arbitrary criteria to select one user if no user is selected using the user indexes.

14. The method of claim 6, further comprising:
using the index to determine at least one additional user to assign the new work item.

15. A system method for assigning a work item in a workflow, comprising:
a storage device;
a database in the storage device, wherein the database includes a plurality of workflows, wherein each workflow includes a plurality of nodes and work items, wherein during execution of the workflow, the work items for the nodes are assigned to users capable of performing workflow related operations at the nodes, comprising:
an access list indicating users capable of being assigned a current work item;
means for processing a node in a current workflow, wherein the current work item is associated with the processed node;
means for determining from the access list users capable of being assigned the current work item;
means for determining, for each determined user, a number of work items other than the current work item assigned to the user in the current workflow and in a workflow other than the current workflow;
means for using a load balancing technique that considers the number of work items assigned to the at least one determined user on the access list in the current and the other workflows to select at least one determined user based on the determined number of work items assigned to the determined users; and
means for assigning the current work item to the at least one selected determined user.

16. The system of claim 15, wherein the determined number of work items assigned to each user includes active work items assigned to the user in workflows other than the current workflow.

17. The system of claim 16, wherein the determined number of work items further include active work items assigned to the user in the current workflow other than the current work item.

18. The system of claim 15, wherein the determined users comprise users on the access list associated with the current workflow.

19. The system of claim 15, wherein the means for determining the number of work items assigned to each user further performs:
determining work items for which the user has exclusive access; and
determining work items that are not owned by another user and that are associated with an access list that includes the user.

20. The system of claim 15, wherein the means for using the load balancing technique to select at least one determined user based on the determined number of work items assigned to the determined users further performs:
for each work item assigned to the user, determining a priority related to the work item; for each user calculating an index based at least on each priority related to each work item assigned to the user; and
using the index to select one user to assign a new work item.

21. The system of claim 20, wherein the priority related to the work item comprises a priority assigned to the workflow in which the work item is included.

22. The system of claim 20, further comprising:
means for receiving a user defined priority, wherein the user defined priority is the priority related to the work item.

23. The system of claim 22, wherein the user defined priority is for the workflow including the work item assigned to the user.

24. The system of claim 20, further comprising:
means for receiving a user defined priority scheme associating a plurality of user defined priorities with a plurality of normalized ratings; and
means for determining a user defined priority related to the work item, wherein the determined priority related to the work item used to calculate the index comprises the normalized rating associated with the user defined priority.

25. The system of claim 20, wherein the means for selecting the user selects the user having a lowest index value.

26. The system of claim 25, further comprising:
means for determining, if no one user has the lowest index value, one user having a least number of assigned work items from the users having a same lowest index value, wherein the determined user having the least number of assigned work items comprises the selected one user.

27. The system of claim 20, further comprising:
means for using an arbitrary criteria to select one user if no user is selected using the user indexes.

28. The system of claim 20, further comprising:
means for using the index to determine at least one additional user to assign the new work item.

29. An article of manufacture including code implemented on a computer readable medium for assigning a work item for one of a plurality of nodes in a workflow to at least one of a plurality of users capable of performing workflow related operations at the nodes by:
processing a node in a current workflow, wherein a current work item is associated with the processed node;
processing an access list indicating users capable of being assigned the current work item;
determining from the access list at least one user capable of being assigned the current work item;

for each determined user, determining a number of work items other than the current work item assigned to the user in the current workflow and in a workflow other than the current workflow;

using a load balancing technique that considers the number of work items assigned to the at least one determined user on the access list in the current and the other workflows to select at least one determined user based on the determined number of work items assigned to the determined users; and assigning the current work item to the at least one selected determined user.

30. The article of manufacture of claim 29, wherein the determined number of work items assigned to each user includes active work items assigned to the user in workflows other than the current workflow.

31. The article of manufacture of claim 30, wherein the determined number of work items further include active work items assigned to the user in the current workflow other than the current work item.

32. The article of manufacture of claim 29, wherein the determined users comprise users on the access list associated with the current workflow.

33. The article of manufacture of claim 29, wherein determining the number of work items assigned to each user further comprises:

determining work items for which the user has exclusive access; and determining work items that are not owned by another user and that are associated with an access list that includes the user.

34. The article of manufacture of claim 29, wherein the means for using the load balancing technique to select at least one determined user based on the determined number of work items assigned to the determined users further comprises:

for each work item assigned to the user, determining a priority related to the work item;

for each user calculating an index based at least on each priority related to each work item assigned to the user; and using the index to select one user to assign a new work item.

35. The article of manufacture of claim 34, wherein the priority related to the work item comprises a priority assigned to the workflow in which the work item is included.

36. The article of manufacture of claim 34, further comprising:

receiving a user defined priority, wherein the user defined priority is the priority related to the work item.

37. The article of manufacture of claim 36, wherein the user defined priority is for the workflow including the work item assigned to the user.

38. The article of manufacture of claim 34, further comprising:

receiving a user defined priority scheme associating a plurality of user defined priorities with a plurality of normalized ratings; and determining a user defined priority related to the work item, wherein the determined priority related to the work item used to calculate the index comprises the normalized rating associated with the user defined priority.

39. The article of manufacture of claim 34, wherein the selected user comprises the user having a lowest index value.

40. The article of manufacture of claim 39, further comprising:

if no one user has the lowest index value, determining from the users having a same lowest index value one user having a least number of assigned work items, wherein the determined user having the least number of assigned work items comprises the selected one user.

41. The article of manufacture of claim 34, further comprising:

using an arbitrary criteria to select one user if no user is selected using the user indexes.

42. The article of manufacture of claim 34, further comprising:

using the index to determine at least one additional user to assign the new work item.

* * * * *